United States Patent
Nishiyama et al.

(10) Patent No.: US 9,802,573 B2
(45) Date of Patent: Oct. 31, 2017

(54) SMART KEY SYSTEM

(71) Applicant: TOYOTA JIDOSHA KABUSHIKI KAISHA, Toyota-shi, Aichi-ken (JP)

(72) Inventors: Shigeki Nishiyama, Nagoya (JP); Tomoyuki Funayama, Toyota (JP)

(73) Assignee: TOYOTA JIDOSHA KABUSHIKI KAISHA, Toyota-Shi, Aich-Ken (JP)

(*) Notice: Subject to any disclaimer, the term of this patent is extended or adjusted under 35 U.S.C. 154(b) by 0 days.

(21) Appl. No.: 15/458,134

(22) Filed: Mar. 14, 2017

(65) Prior Publication Data
US 2017/0274870 A1    Sep. 28, 2017

(30) Foreign Application Priority Data
Mar. 23, 2016 (JP) .................... 2016-058978

(51) Int. Cl.
*B60R 25/24* (2013.01)

(52) U.S. Cl.
CPC .................... *B60R 25/24* (2013.01)

(58) Field of Classification Search
CPC ...... G07C 9/00309; G07C 2009/00769; G07C 9/00111; G07C 9/00007; G07C 9/00571; G07C 2009/00793; G07C 2209/63
USPC ........................................ 340/5.61
See application file for complete search history.

(56) References Cited

U.S. PATENT DOCUMENTS

| | | | |
|---|---|---|---|
| 8,487,740 B2 * | 7/2013 | Tsuruta | B60R 25/04 235/375 |
| 9,143,347 B2 * | 9/2015 | Ando | H04L 12/40013 |
| 2008/0024270 A1 * | 1/2008 | Katagiri | B60R 25/04 340/5.72 |
| 2013/0090783 A1 | 4/2013 | Katou | |
| 2015/0170444 A1 * | 6/2015 | Yasui | G07C 9/00007 340/5.61 |
| 2016/0205498 A1 * | 7/2016 | Takigawa | B60R 25/245 455/41.2 |
| 2016/0304056 A1 * | 10/2016 | Miyazawa | G07C 9/00309 |
| 2016/0378104 A1 * | 12/2016 | Hiei | B60Q 9/00 701/2 |

FOREIGN PATENT DOCUMENTS

| | | |
|---|---|---|
| JP | 2013083051 A | 5/2013 |
| WO | 2014/125650 A1 | 8/2014 |

\* cited by examiner

*Primary Examiner* — Mark Blouin
(74) *Attorney, Agent, or Firm* — Oliff PLC (57) ABSTRACT

A smart key system includes a control unit mounted on a vehicle and configured to cause vehicle-mounted equipment to perform a predetermined operation when a first receiving unit has shifted from a state where a response signal is receivable to a state where the response signal is unreceivable in a case where a predetermined manipulation has been performed in the vehicle or a portable device; and a communicable distance extending unit configured such that at least one of a transmission intensity with which a first transmitting unit transmits a request signal and a reception sensitivity with which a second receiving unit receives the request signal is made higher than a predetermined normal value until a predetermined timing when the predetermined manipulation has been performed in the vehicle or the portable device.

8 Claims, 6 Drawing Sheets

SMART KEY SYSTEM

INCORPORATION BY REFERENCE

The disclosure of Japanese Patent Application No. 2016-058978 filed on Mar. 23, 2016 including the specification, drawings and abstract is incorporated herein by reference in its entirety.

BACKGROUND

1. Technical Field

The present disclosure relates to a smart key system.

2. Description of Related Art

In the related art, there are known smart key systems that cause vehicle-mounted equipment to perform a predetermined operation (for example, locking or unlocking of a door, or the like) on the basis of transmission and reception of signals in both directions between a vehicle (vehicle-mounted device) and a portable device when a user carries a smart key (portable device). Specifically, in a smart key system as an example, a low-frequency request signal is transmitted from a vehicle (vehicle-mounted device), a portable device transmits a high-frequency response signal, a smart key is certified on the basis of the response signal received by the vehicle-mounted device, and vehicle-mounted equipment is made to perform a predetermined operation on the basis of a certification result.

In this smart key system, a technique of periodically switching the reception sensitivity of the request signal in the portable device between a predetermined normal sensitivity and a high sensitivity higher than this normal sensitivity is suggested (for example, refer to Japanese Patent Application Publication No. 2013-83051 (JP 2013-83051 A)).

According to the technique disclosed in JP 2013-83051 A, the reception sensitivity of the request signal can be periodically the high sensitivity. Therefore, the portable device can perform communication between the vehicle-mounted device and the portable device even in a case where a user is present out of an area where the request signal is receivable with the normal sensitivity. That is, a communicable distance when the request signal is transmitted from the vehicle-mounted device to the portable device (hereinafter simply referred to as a "communicable distance") can be periodically extended.

For example, there is a case where the vehicle-mounted device determines that the user is apart from the vehicle by viewing a timing at which the response signal from the portable device is interrupted after a predetermined manipulation (closing reservation manipulation of an electric door, closing manipulation of a door, or the like) has been performed in the vehicle, and the vehicle-mounted equipment is made to perform the predetermined operation (the closing of the door, locking of the door, or the like). In this case, while the communicable distance remains normal, it becomes impossible for the portable device to receive the request signal when the user has been slightly apart from the vehicle. As a result, irrespective of the user is not sufficiently apart from the vehicle in practice, the vehicle-mounted device may determine that the user has been apart from the vehicle. In contrast, by extending the communicable distance, the portable device can receive the request signal from the vehicle-mounted device even if the portable device is at a position further apart from the vehicle. Therefore, the vehicle-mounted device can receive the response signal from the portable device until the user is sufficiently kept from the vehicle. For that reason, it is confirmed that the user has been sufficiently apart from the vehicle, so that the vehicle-mounted equipment can be made to perform the predetermined operation.

SUMMARY

However, since the communicable distance is periodically extended in the case of the technique disclosed in JP 2013-83051 A regardless needs, inconvenience may occur. That is, the communicable distance may be extended in a situation where the extension of the communicable distance is unnecessary. For example, in order to enhance the reception sensitivity, the consumption current of the portable device may increase vainly and the battery lifespan of the portable device may decrease. Additionally, even in a situation where the extension of the communicable distance is necessary, a case where the communicable distance remains normal is also assumed depending on timing, and the communicable distance may be unable to be extended in a situation where communicable distance is necessary.

The disclosure provides a smart key system that can extend a communicable distance when a request signal is transmitted from a vehicle to a portable device if necessary.

In an aspect of the disclosure, there is provided a smart key system that causes vehicle-mounted equipment to perform a predetermined operation based on two-way communication between a vehicle and a portable device. The smart key system includes a first transmitting unit mounted on the vehicle and configured to transmit a request signal toward an outside of a vehicle compartment of the vehicle; a first receiving unit mounted on the vehicle and configured to receive an electric wave from an outside of the vehicle compartment of the vehicle; a second receiving unit mounted on the portable device and configured to receive an electric wave from an outside of the portable device; a second transmitting unit mounted on the portable device and configured to transmit an electric wave to the outside of the portable device, the second transmitting unit being configured to transmit a response signal to the vehicle when the second receiving unit has received the request signal; a control unit mounted on the vehicle and configured to cause the vehicle-mounted equipment to perform the predetermined operation when the first receiving unit has shifted from a state where the response signal is receivable to a state where the response signal is unreceivable in a case where a predetermined manipulation has been performed in the vehicle or the portable device; and a communicable distance extending unit configured such that at least one of a transmission intensity with which the first transmitting unit transmits the request signal and a reception sensitivity with which the second receiving unit receives the request signal is made higher than a predetermined normal value until a predetermined timing when the predetermined manipulation has been performed in the vehicle or the portable device.

According to the above aspect, the first transmitting unit mounted on the vehicle transmits the request signal toward the outside of the vehicle compartment, the second receiving unit mounted on the portable device receives the request signal from the outside, the second transmitting unit mounted on the portable device transmits the response signal to the vehicle, and the first receiving unit mounted on the vehicle receives the response signal from the outside of the vehicle compartment. Additionally, the control unit mounted on the vehicle causes the vehicle-mounted equipment to perform the predetermined operation when the first receiving unit mounted on the vehicle has shifted from the state where the response signal is receivable from the portable device to the state where the response signal is unreceivable in a case where a predetermined manipulation has been performed in the vehicle or the portable device. Therefore, when it becomes impossible for the first receiving unit to receive the response signal from the portable device, it can be determined that a user who possesses the portable device has been apart from the vehicle. For that reason, the vehicle-mounted equipment can be made to perform the predetermined operation on the basis of the predetermined manipulation in the vehicle or the portable device, with an event that the user has been apart from the vehicle as a trigger.

Also, the communicable distance extending unit makes the transmission intensity with which the first transmitting unit transmits the request signal or the reception sensitivity with which the second receiving unit receives the request signal higher than the predetermined normal value until the predetermined timing when the predetermined manipulation has been performed in the vehicle or the portable device. Therefore, when the predetermined manipulation is performed in the vehicle or the portable device, it is possible to determine that the current stage is a stage before the control unit makes the vehicle-mounted equipment perform the predetermined operation. For that reason, by extending the communicable distance based on the request signal from the vehicle to the portable device with an event that the predetermined manipulation has been performed as a trigger, it is confirmed that the user has been sufficiently apart from the vehicle, so that the vehicle-mounted equipment can be made to perform the predetermined operation. That is, if necessary, the communicable distance when transmitting the request signal from the vehicle to the portable device can be extended.

Additionally, in the above aspect, the predetermined timing may be specified as after the second receiving unit has shifted from the state where the request signal is receivable to the state where the request signal is unreceivable.

According to the above configuration, the communicable distance based on the request signal from the vehicle to the portable device is extended until it becomes impossible for the second receiving unit mounted on the portable device to receive the request signal. Therefore, whether or not the first receiving unit can receive the second signal reliably in a state where the communicable distance is extended can be monitored until it becomes impossible for the second receiving unit to receive the request signal, that is, until it becomes impossible for the first receiving unit to receive the response signal. For that reason, it is reliably determined that the user has been sufficiently kept away, so that the vehicle-mounted equipment can be operated.

Additionally, in the above aspect, the vehicle-mounted equipment may be an electric door, and the predetermined operation may be closing of the electric door.

According to the above configuration, the control unit closes the electric door when the first receiving unit has shifted from the state where the second signal (response signal) is receivable to the state where the second signal is unreceivable in a case where the predetermined manipulation (for example, ON-manipulation of a closed switch of the electric door) has been performed. Additionally, the communicable distance extending unit makes the transmission intensity with which the first transmitting unit transmits the first signal (request signal) or the reception sensitivity with which the second receiving unit receives the first signal high until the predetermined timing when the predetermined manipulation has been performed. Therefore, the electric door can be closed on the basis of the predetermined manipulation, with an event that the user has been apart from the vehicle as a trigger. For that reason, it is confirmed that the user has been sufficiently apart from the vehicle, so that the electric door can be closed. For that reason, it is possible to avoid a situation where a discomfort is given to the user, for example, due to the electric door being closed in a situation with no intention of leaving the vehicle (for example, a situation in which the user turns from the right of the vehicle to the left thereof and performs unloading of goods) or the electric door beginning to move at a position where the user feels physiologically near.

Additionally, in the above aspect, the vehicle-mounted equipment may be a locking device of a door, and the predetermined operation may be locking.

According to the above configuration, the control unit locks the door using the locking device when the first receiving unit has shifted from the state where the second signal (response signal) is receivable to the state where the second signal is unreceivable in a case where the predetermined manipulation (for example, manipulation of a closed switch of the electric door) has been performed. Additionally, the communicable distance extending unit makes the transmission intensity with which the first transmitting unit transmits the first signal (request signal) or the reception sensitivity with which the second receiving unit receives the first signal high until the predetermined timing in a case where the predetermined manipulation has been performed. Therefore, the door can be locked on the basis of the predetermined manipulation, with an event that the user has been apart from the vehicle as a trigger. Additionally, since it is possible to confirm that the user has been sufficiently apart from the vehicle and the door can be locked, it is possible to avoid a situation where a discomfort is given to the user, for example, due to the door being locked at a situation with no intention of leaving the vehicle (for example, a situation in which the user turns from the right of the vehicle to the left thereof and performs unloading of goods).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments for carrying out the disclosure will be described with reference to the drawings.

Figure 1:
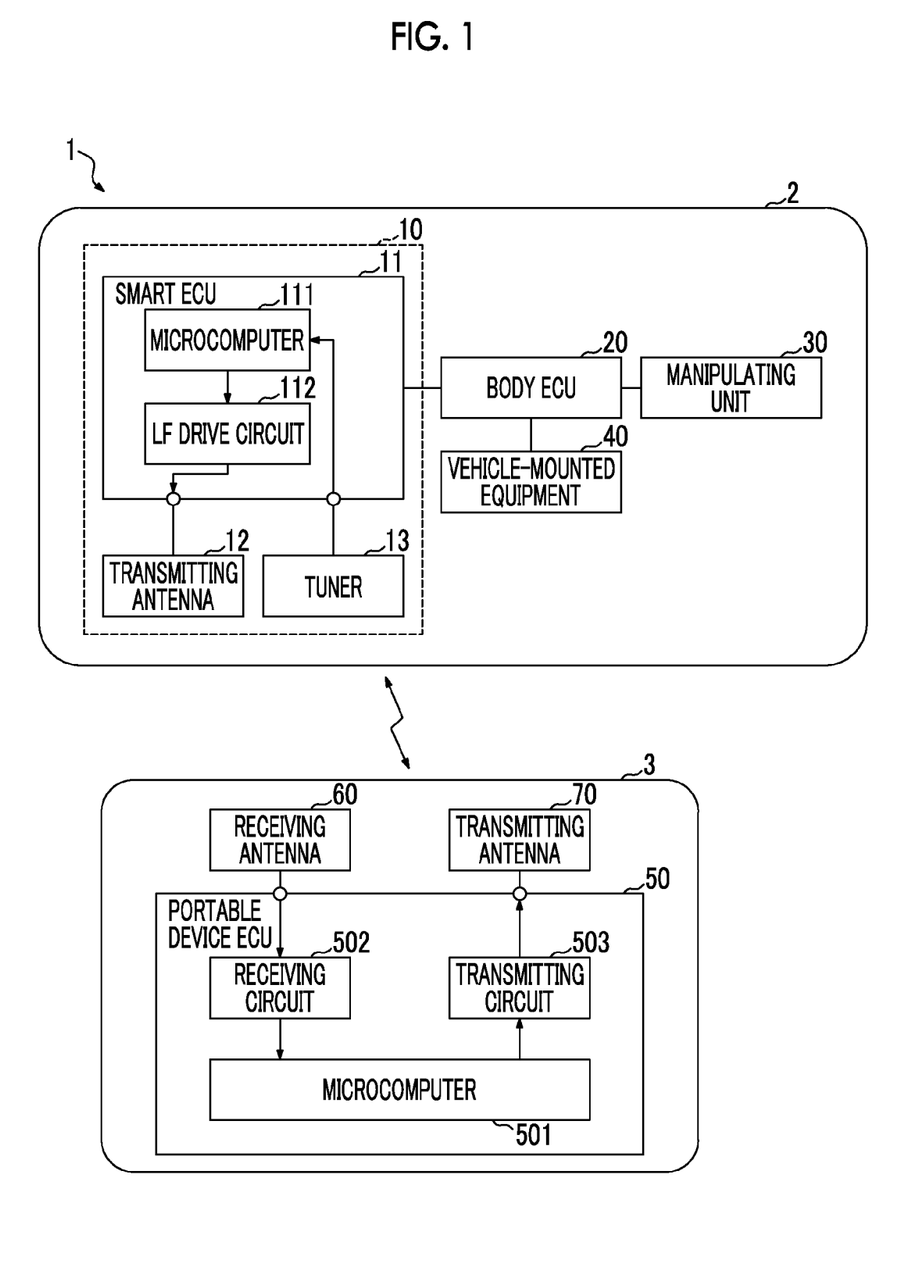
FIG. 1 is a configuration view schematically illustrating an example of the configuration of a smart key system.

FIG. 1 is a configuration view schematically illustrating an example of the configuration of a smart key system 1 related to the present embodiment. The smart key system 1 causes vehicle-mounted equipment 40 to perform a predetermined operation based on two-way communication between a vehicle 2 and a portable device (smart key) 3.

For example, if a user who possesses the portable device 3 performs the manipulation of touching a touch sensor built in a door of the vehicle 2, a vehicle-mounted device 10 (to be described below) of the vehicle 2 transmits a low frequency (LF) signal (request signal) toward the outside of a vehicle compartment, and the portable device 3 that has received the LF signal transmits a radio frequency (RF) signal (response signal). Then, the vehicle-mounted device 10 receives the RF signal, performs certification of the authenticity of the portable device 3 on the basis of information included in the RF signal, and unlocks the door of the vehicle 2 if the certification succeeds. Accordingly, the user who possesses the portable device 3 can realize the unlocking or the like of the door of the vehicle 2 or the like simply by approaching the vehicle 2 and performing a predetermined manipulation such as touching the touch sensor of a door handle. That is, in the smart key system 1, the user can make the vehicle-mounted equipment 40 (in the case of the present example, a door-lock motor that performs unlock a door) perform the predetermined operation (in the case of the present example a locking operation), simply by approaching the vehicle 2 and performing the predetermined manipulation (in the present example, the manipulation of touching the touch sensor, or the like).

Additionally, for example, if the user who possesses the portable device 3 performs ON-manipulation of a closed switch of an electric door of the vehicle 2, certification of the authenticity of the portable device 3 is performed by transmission and reception of the same signal. Then, the vehicle-mounted device 10 transmits the LF signal (request signal), the portable device 3 that has received the LF signal returns an RF signal (response signal), and the vehicle-mounted device 10 repeats a series of operation of receiving the RF signal. If the vehicle-mounted device 10 cannot receive the RF signal, the electric door (for example, a power slid door (PSD), a power backdoor (PBD), or the like) is automatically closed. Accordingly, the user who possesses the portable device 3 can automatically close the electric door simply by keeping the LF signal transmitted from the vehicle-mounted device 10 away to a position where the portable device 3 cannot receive the LF signal after the predetermined manipulation, that is, a reservation manipulation is performed. That is, in the smart key system 1, the user can make the vehicle-mounted equipment 40 (in the case of the present example, the electric door) perform the predetermined operation (in the case of the present example, door closing) simply by being apart from the vehicle 2 after the predetermined manipulation (in the case of the present example, the ON-manipulation of the closed switch) is performed. Hereinafter, the present embodiment will be described mainly about the latter function. In addition, in the present embodiment, the "door" is used in a concept including not only a front seat door, a rear seat door, and the like for allowing a passenger of the vehicle 2 to get on and off but also a lift gate that performs unloading of goods of the vehicle 2, a backdoor, a trunk lid, and the like.

The vehicle 2 includes the vehicle-mounted device 10, a body electronic control unit (ECU) 20, a manipulating unit 30, and the vehicle-mounted equipment 40.

The vehicle-mounted device 10 makes the vehicle-mounted equipment 40 perform the predetermined operation, on the basis of transmission and reception of a signal between the vehicle-mounted device and the portable device 3. The vehicle-mounted device 10 includes a smart electronic control unit (ECU) 11, a transmitting antenna 12, and a tuner 13.

The smart ECU 11 is an electronic control unit that executes main control processing in the smart key system 1. The smart ECU 11 includes a microcomputer 111 and an LF drive circuit 112.

The microcomputer 111 includes a CPU, a ROM, a RAM, an I/O, an internal memory, and the like, and realizes various kinds of control processing by executing various programs stored in the ROM using the CPU. Hereinafter, a functional block of the microcomputer 111 will be described with reference to FIG. 2.

Figure 2:
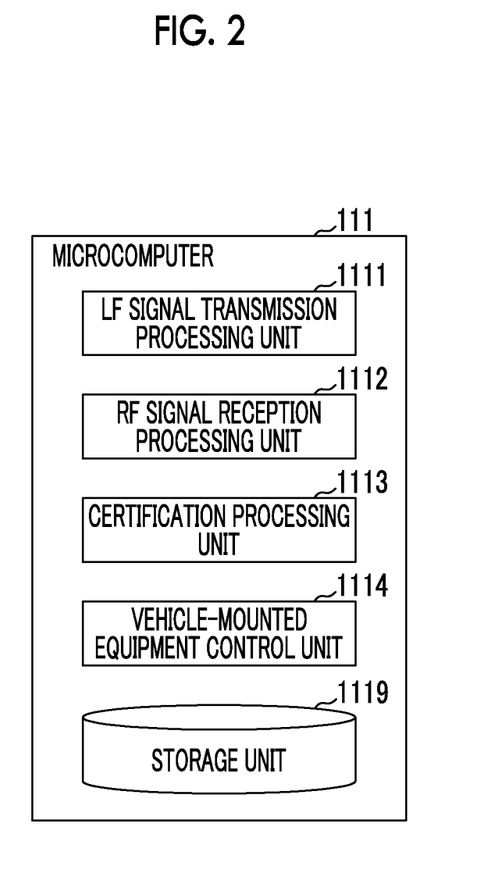
FIG. 2 is a functional block diagram of a microcomputer within a smart ECU.

FIG. 2 is a functional block diagram of the microcomputer 111. The microcomputer 111 includes an LF signal transmission processing unit 1111, an RF signal reception processing unit 1112, a certification processing unit 1113, a vehicle-mounted equipment control unit 1114, and a storage unit 1119. Respective functions of the LF signal transmission processing unit 1111, the RF signal reception processing unit 1112, the certification processing unit 1113, and the vehicle-mounted equipment control unit 1114 are realized by executing one or more programs stored in the ROM using the CPU. Additionally, the storage unit 1119 is realized as a storage region that is specified in advance in the nonvolatile internal memory.

The LF signal transmission processing unit 1111 performs the processing of transmitting a predetermined signal (request signal) via the LF drive circuit 112 and the transmitting antenna 12. Specifically, the LF signal transmission processing unit 1111 generates a signal (LF original signal) serving as an origin of the LF signal and outputs this signal to the LF drive circuit 112, and the LF drive circuit 112 modulates the LF original signal into the LF signal and outputs the modulated LF signal from the transmitting antenna 12 to the outside of the vehicle compartment.

The RF signal reception processing unit 1112 performs the processing of receiving an electric wave in an RF band from the outside of the vehicle 2 via the tuner 13, for example, an RF signal transmitted from the portable device 3. Specifically, the RF signal reception processing unit 1112 receives an RF signal (RF original signal) demodulated by the tuner 13.

The certification processing unit 1113 performs certification of the authenticity of the portable device 3 on the basis of the information included in the RF signal (response signal) transmitted from the portable device 3. As methods of certifying the authenticity of the portable device 3, for example, arbitrary methods, such as collation of an identifier unique to the portable device 3, challenge response certification, or combinations thereof, are adopted. In the case of the challenge response certification, the certification processing unit 1113 generates an encryption code (a so-referred to as "challenge") capable of being decrypted with an encryption key set unique to the portable device 3, and sends a transmission request of the LF signal to the LF signal transmission processing unit 1111. Additionally, the LF signal transmission processing unit 1111 transmits the LF signal including the encryption code ("challenge") to the portable device 3 via the LF drive circuit 112 and the transmitting antenna 12 according to the transmission request. Additionally, the portable device 3 transmits an RF signal including a decryption result (a so-called "response") of the encryption code included in the LF signal to the vehicle-mounted device 10, if the LF signal is received. Then, the certification processing unit 1113 compares the decryption result caused by the encryption key of the "challenge" with the "response", and in a case where there is coincidence, the portable device 3 is certified (certification success). Hereinafter, in the LF signal (request signal) transmitted from the LF signal transmission processing unit 1111, a signal, which requests transmission of certification information (the identifier, the "challenge", and the like that are unique to the portable device 3), is referred to as a "first LF signal", and a signal (a polling signal or the like intended to detect the portable device 3), which does not request the transmission of the certification information, is referred to as a "second LF signal".

The vehicle-mounted equipment control unit 1114 performs the processing of making the vehicle-mounted equipment 40 perform the predetermined operation on the basis of predetermined conditions. Specifically, the vehicle-mounted equipment control unit 1114 outputs an operation request to the body ECU 20, and causes the vehicle-mounted equipment 40 to perform the predetermined operation via the body ECU 20. The details will be described below.

The identifier, the encryption key, and the like that are unique to the portable device 3 to be used in the processing in the certification processing unit 1113 are saved in the storage unit 1119 on the basis of registration processing that is performed in advance.

Returning to FIG. 1, the LF drive circuit 112 modulates the LF original signal input from the LF signal transmission processing unit 1111, and outputs the LF signal to the transmitting antenna 12.

The transmitting antenna 12 transmits the LF signal input from the LF drive circuit 112 as an electric wave toward the outside of the vehicle compartment. The transmitting antenna 12 is built in, for example, a door handle of each door of the vehicle 2.

The tuner 13 receives and demodulates an electric wave in the RF band from the outside of the vehicle compartment, for example, the RF signal transmitted from the portable device 3, and outputs the demodulated RF signal (RF original signal) to the smart ECU 11. The tuner 13 is installed, for example, in such a manner that the tuner is covered with a trim within a trunk of the vehicle 2.

The body ECU 20 is an electronic control unit that performs the operation control of the vehicle-mounted equipment 40. The body ECU 20 makes the vehicle-mounted equipment 40 perform the predetermined operation according to an operation request received from the smart ECU 11 (specifically, the vehicle-mounted equipment control unit 1114). Additionally, the body ECU 20 is connected so as to be communicable with the manipulating unit 30, and if the predetermined manipulation in the manipulating unit 30 is received, such effect is transmitted to the smart ECU 11.

The manipulating unit 30 is provided for allowing the user to perform the predetermined manipulation relating to the vehicle-mounted equipment 40. The details of the predetermined manipulation or the like in the manipulating unit 30, will be described below.

In addition, the manipulating unit 30 may be directly connected to the smart ECU 11, and a signal (manipulation signal) corresponding to the predetermined manipulation in the manipulating unit 30 relating to the vehicle-mounted equipment 40 may be directly input to the smart ECU 11 without going through the body ECU 20.

The vehicle-mounted equipment 40 is a device that serves as a target on which the predetermined operation is performed, on the basis of the predetermined manipulation in the manipulating unit 30. The vehicle-mounted equipment 40 includes, for example, a door-lock motor or a drive motor or the like that drives the electric door.

The portable device 3 includes a portable device ECU 50, a receiving antenna 60, and a transmitting antenna 70.

The portable device ECU 50 is an electronic control unit that performs various kinds of control processing in the portable device 3. The portable device ECU 50 includes a microcomputer 501, a receiving circuit 502, and a transmitting circuit 503.

The microcomputer 501 includes a CPU, a ROM, a RAM, an I/O, a nonvolatile internal memory, and the like, and realizes various kinds of control processing by executing various programs stored in the ROM using the CPU. Hereinafter, a functional block of the microcomputer 501 will be described with reference to FIG. 3.

Figure 3:
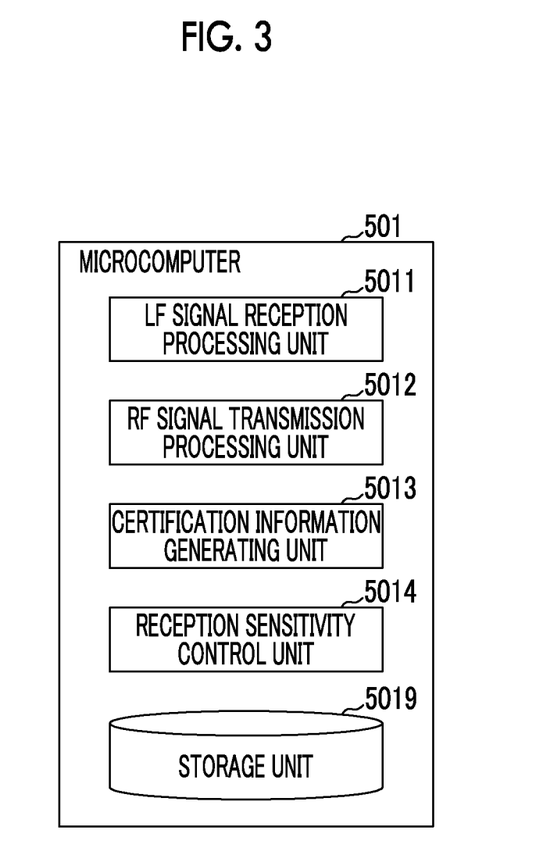
FIG. 3 is a functional block diagram of a microcomputer within a portable ECU.

FIG. 3 is a functional block diagram of the microcomputer 501. The microcomputer 501 includes an LF signal reception processing unit 5011, an RF signal transmission processing unit 5012, a certification information generating unit 5013, a reception sensitivity control unit 5014, and a storage unit 5019. Respective functions of the LF signal reception processing unit 5011, the RF signal transmission processing unit 5012, the certification information generating unit 5013, and the reception sensitivity control unit 5014 are realized by executing one or more programs stored in the ROM using the CPU. Additionally, the storage unit 5019 is realized as a storage region that is specified in advance in the nonvolatile internal memory.

The LF signal reception processing unit 5011 performs the processing of receiving the electric wave in the LF band from the outside, for example, the LF signal transmitted from the vehicle-mounted device 10, via the receiving antenna 60 and the receiving circuit 502. Specifically, the LF signal reception processing unit 5011 receives the LF signal (LF original signal) that has been received in the receiving antenna 60 and demodulated in the receiving circuit 502.

The RF signal transmission processing unit 5012 performs the processing of transmitting an RF signal to the vehicle 2 (specifically, the vehicle-mounted device 10) via the transmitting circuit 503 and the transmitting antenna 70. Specifically, the RF signal transmission processing unit 5012 generates a signal (RF original signal) serving as an origin of an RF signal and outputs this signal to the transmitting circuit 503, and the transmitting circuit 503 modulates the RF original signal into an RF signal and outputs the modulated RF signal from the transmitting antenna 70 to the outside of the vehicle compartment.

The certification information generating unit 5013 generates the certification information (the unique identifier, the unique "challenge", and the like) on the basis of the information (for example, the identifier, the encryption key, and the like that are unique to the portable device 3) stored in the storage unit 5019, and sends a transmission request of an RF signal including the certification information to the RF signal transmission processing unit 5012, if the LF signal reception processing unit 5011 receives the first LF signal (the request signal that requests the certification information) from the vehicle-mounted device 10. Hereinafter, in the RF signal (response signal) transmitted from the RF signal transmission processing unit 5012, a signal including the certification information is referred to as a "first RF signal", and a signal not including the certification information is referred to as a "second RF signal".

The reception sensitivity control unit 5014 performs the processing of adjusting the sensitivity (reception sensitivity) with which the LF signal reception processing unit 5011 detects the electric wave in the LF band via the receiving circuit 502, for example, the LF signal transmitted from the vehicle-mounted device 10. Specifically, the reception sensitivity control unit 5014 has two reception sensitivity modes including a "normal sensitivity mode" where the reception sensitivity of the receiving circuit 502 is set to a predetermined normal sensitivity (normal value), and a "high sensitivity mode" where the reception sensitivity of the receiving circuit 502 is set to a predetermined high sensitivity higher than the normal sensitivity. The reception sensitivity control unit 5014 performs switching between the two reception sensitivity modes according to the processing to be described below.

The storage unit 5019 stores the information (for example, the unique identifier, the unique encryption key, and the like) for generating the certification information.

Returning to FIG. 1, the receiving circuit 502 receives and demodulates the electric wave in the LF band from the outside, that is, the LF signal transmitted from the vehicle-mounted device 10, and outputs the demodulated LF signal (LF original signal) to the portable device ECU 50. Additionally, the receiving circuit 502 includes an amplifier (not illustrated) or the like for adjusting the reception sensitivity, and can adjust the amount of an electric current of the amplifier or the like according to a control command from the reception sensitivity control unit 5014 to realize the reception sensitivity corresponding to the "normal sensitivity mode" or the "high sensitivity mode". That is, the receiving circuit 502 increases the amount of the electric current of the amplifier if a control command (hereinafter, referred to as a "high sensitivity command") of the effect of being changed to the "high sensitivity mode" in the state of the "normal sensitivity mode" is input from the reception sensitivity control unit 5014. Additionally, the receiving circuit 502 reduces the amount of the electric current of the amplifier if a control command (hereinafter, referred to as a "normal sensitivity command") of the effect of being changed (returned) to the "normal sensitivity mode" in the state of the "high sensitivity mode" is input from the reception sensitivity control unit 5014.

The transmitting circuit 503 modulates the RF original signal input from the RF signal transmission processing unit 5012, and outputs the RF signal to the transmitting antenna 70.

The receiving antenna 60 receives the electric wave in the LF band from the outside of the portable device 3, for example, the LF signal transmitted from the vehicle-mounted device 10, and outputs the LF signal to the receiving circuit 502.

The transmitting antenna 70 transmits the RF signal input from the transmitting circuit 503 as an electric wave toward the outside of the portable device 3.

Next, the characteristic processing performed by the smart key system 1 related to the present embodiment will be described with reference to FIGS. 4 and 5.

Figure 4:
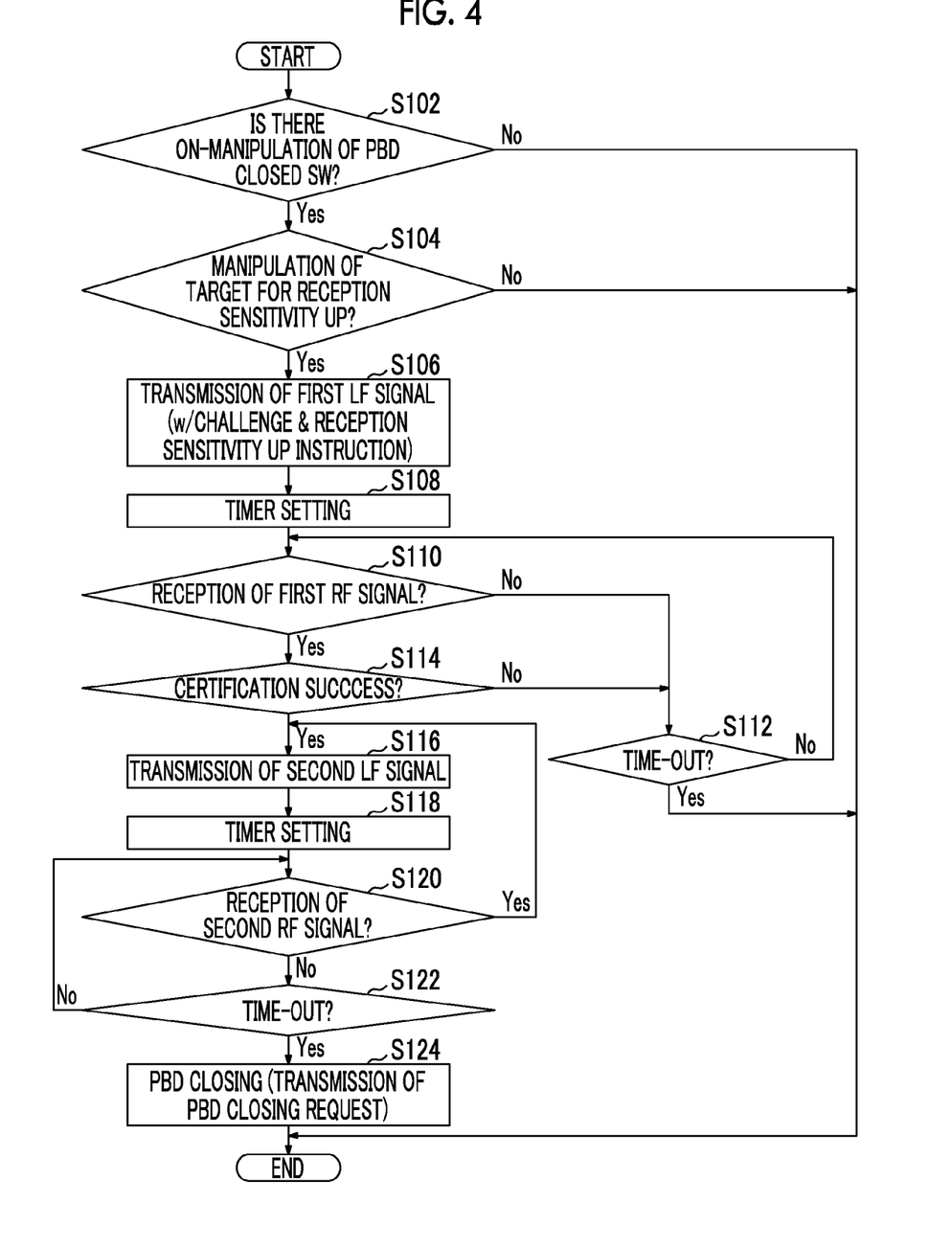
FIG. 4 is a flowchart schematically illustrating an example of processing in a vehicle-mounted device.

FIG. 4 is a flowchart schematically illustrating an example of processing performed by the vehicle-mounted device 10. Additionally, FIG. 5 is a flowchart schematically illustrating an example of processing performed by the portable device 3, and illustrates a processing flow corresponding to processing performed by the vehicle-mounted device 10 of FIG. 4. In the present example, it is premised that the vehicle-mounted equipment 40 is a PBD as an example, and the manipulating unit 30 is a PBD closed switch (hereinafter referred to as a "PBD closed SW") installed in the vehicle 2 as an example. The PBD closed switch is provided, for example, in a side surface of a trunk that allows a user to have easy access thereto from the rear of the vehicle 2 in a state where the PBD is open.

In addition, for example, the processing based on the flowchart of FIG. 4 is repeatedly executed at predetermined time intervals during the period of the completion of initial processing after the ignition ON of the vehicle 2 (IG-ON) to ignition-OFF (IG-OFF). Additionally, the processing based on the flowchart of FIG. 5 is repeated executed at predetermined time intervals, for example, in a case where the portable device 3 is in the wake state. Additionally, description will be made on the premise that the receiving circuit 502 is initialized in the "normal sensitivity mode" at the time of wake of the portable device 3. Additionally, in the present example, description will be made on the premise that a certification method of certifying the authenticity of the portable device 3 is challenge response certification.

First, with reference to FIG. 4, in Step S102, the vehicle-mounted equipment control unit 1114 determines whether or not ON-manipulation of a PBD closed SW has been performed. The vehicle-mounted equipment control unit 1114 proceeds to Step S104 in a case where the ON-manipulation of the PBD closed SW has been performed, and ends the current processing in a case where no ON-manipulation is performed.

In Step S104, the vehicle-mounted equipment control unit 1114 determines whether or not the ON-manipulation of the PBD closed SW is manipulation of a target (a target for changing the receiving circuit 502 to the "high sensitivity mode") for reception sensitivity UP. For example, a push manipulation (short push manipulation) for a predetermined time or less and a long push manipulation (long push manipulation) longer than the predetermined time are specified in the ON-manipulation of the PBD closed SW, and in a case where only one of these manipulations is matched with the "high sensitivity mode" of the receiving circuit 502, it is determined which manipulation is performed. The vehicle-mounted equipment control unit 1114 proceeds to Step S106 in a case where the ON-manipulation of the PBD closed SW is a target for the reception sensitivity UP, and ends the current processing if not.

In addition, Step S104 is skipped in a case where the ON-manipulation of the PBD closed SW is completely matched with the "high sensitivity mode".

In Step S106, the LF signal transmission processing unit 1111 transmits the first LF signal including the "challenge" generated from the certification processing unit 1113 and a "reception sensitivity UP instruction" generated from the vehicle-mounted equipment control unit 1114.

In Step S108, the RF signal reception processing unit 1112 sets a timer.

In Step S110, the RF signal reception processing unit 1112 determines whether or not the first RF signal has been received from the portable device 3. The RF signal reception processing unit 1112 proceeds to Step S114 in a case where no first RF signal is received, and proceeds to Step S112 in a case where the first RF signal has been received.

In Step S112, the RF signal reception processing unit 1112 determines whether or not the timer has been timed out. The RF signal reception processing unit 1112 returns to Step S110 and repeats its processing in a case where the timer is not timed out, and ends the current processing in a case where the timer is has been timed out.

Meanwhile, in Step S114, the certification processing unit 1113 performs certification of the portable device 3 and determines whether or not there is a certification success, by collating the "response" included in the first RF signal with the decryption result of the "challenge" generated by itself.

The certification processing unit 1113 determines the certification success and proceeds to Step S116, in a case where the "response", and the decryption result of the "challenge" coincide with each other, and determines a certification failure, returns to Step S112, and repeats its processing, in a case where the "response" and the decryption result do not coincide with each other.

In Step S116, the LF signal transmission processing unit 1111 transmits the second LF signal.

In Step S118, the LF signal transmission processing unit 1111 sets a timer.

In Step S120, the RF signal reception processing unit 1112 determines whether or not the second RF signal has been received from the portable device 3. The RF signal reception processing unit 1112 returns to Step S116 and repeats its processing in a case where the second RF signal has been received from the portable device 3, and proceeds to Step S122 in a case where no second RF signal is received.

In Step S122, the RF signal reception processing unit 1112 determines whether or not the timer has been timed out. The RF signal reception processing unit 1112 returns to Step S120 and repeats its processing in a case where the timer is not timed out, and proceeds to Step S124 in a case where the timer has been timed out.

In Step S124, the vehicle-mounted equipment control unit 1114 outputs an operation request (PBD closing request) of the effect that the PBD is closed, to the body ECU 20, and ends the current processing. Accordingly, the body ECU 20 can transmit a control command to a drive motor of the PBD and close the PBD.

Subsequently, with reference to FIG. 5, the LF signal reception processing unit 5011 determines whether or not the first LF signal has been received from the vehicle-mounted device 10 in Step S202. The LF signal reception processing unit 5011 proceeds to Step S204 in a case where the first LF signal has been received, and ends the current processing in a case where no first LF signal is received.

In Step S204, the RF signal transmission processing unit 5012 transmits the first RF signal including the "challenge" generated from the certification information generating unit 5013.

In Step S206, the reception sensitivity control unit 5014 determines whether or not a reception sensitivity UP instruction is included in the first LF signal received by the LF signal reception processing unit 5011. The reception sensitivity control unit 5014 proceeds to Step S208 in a case where the reception sensitivity UP instruction is included in the first LF signal, and ends the current processing in a case where no reception sensitivity UP instruction is included.

In Step S208, the reception sensitivity control unit 5014 transmits a "high sensitivity command" to the receiving circuit 502, and makes the reception sensitivity mode shift from the "normal sensitivity mode" to the "high sensitivity mode".

In Step S210, the LF signal reception processing unit 5011 sets a timer.

In Step S212, the LF signal reception processing unit 5011 determines whether or not the second LF signal has been received from the vehicle-mounted device 10. The LF signal reception processing unit 5011 proceeds to Step S214 in a case where the second LF signal has been received, and proceeds to Step S216 in a case where no second LF signal is received.

In Step S214, the RF signal transmission processing unit 5012 transmits the second RF signal, and returns to Step S210.

Meanwhile, in Step S216, the LF signal reception processing unit 5011 determines whether or not the timer has been timed out. The LF signal reception processing unit 5011 returns to Step S212 and repeats its processing in a case where the timer is not timed out, and proceeds to Step S216 in a case where the timer has been timed out.

In Step S218, the reception sensitivity control unit 5014 transmits a "normal sensitivity command" to the receiving circuit 502, returns the reception sensitivity mode from the "high sensitivity mode" to the "normal sensitivity mode", and ends the current processing.

That is, whenever the LF signal reception processing unit 5011 receives the second LF signal (Yes of Step S212) after the receiving circuit 502 is changed to the "high sensitivity mode" (Step S208), the second RF signal is returned to vehicle-mounted device 10, the timer is reset (Step S210), and the "high sensitivity mode" of the receiving circuit 502 continues. Then, if a state (No of Step S212) where the LF signal reception processing unit 5011 does not receive the second LF signal continues and the timer has been timed out (Yes of Step S216), the receiving circuit 502 returns to the "normal sensitivity mode" (Step S218).

Next, a series of operation of the smart key system 1 caused by the processing related to the flowcharts illustrated in FIG. 4 and FIG. 5 will be described with reference to FIG. 6.

Figure 6:
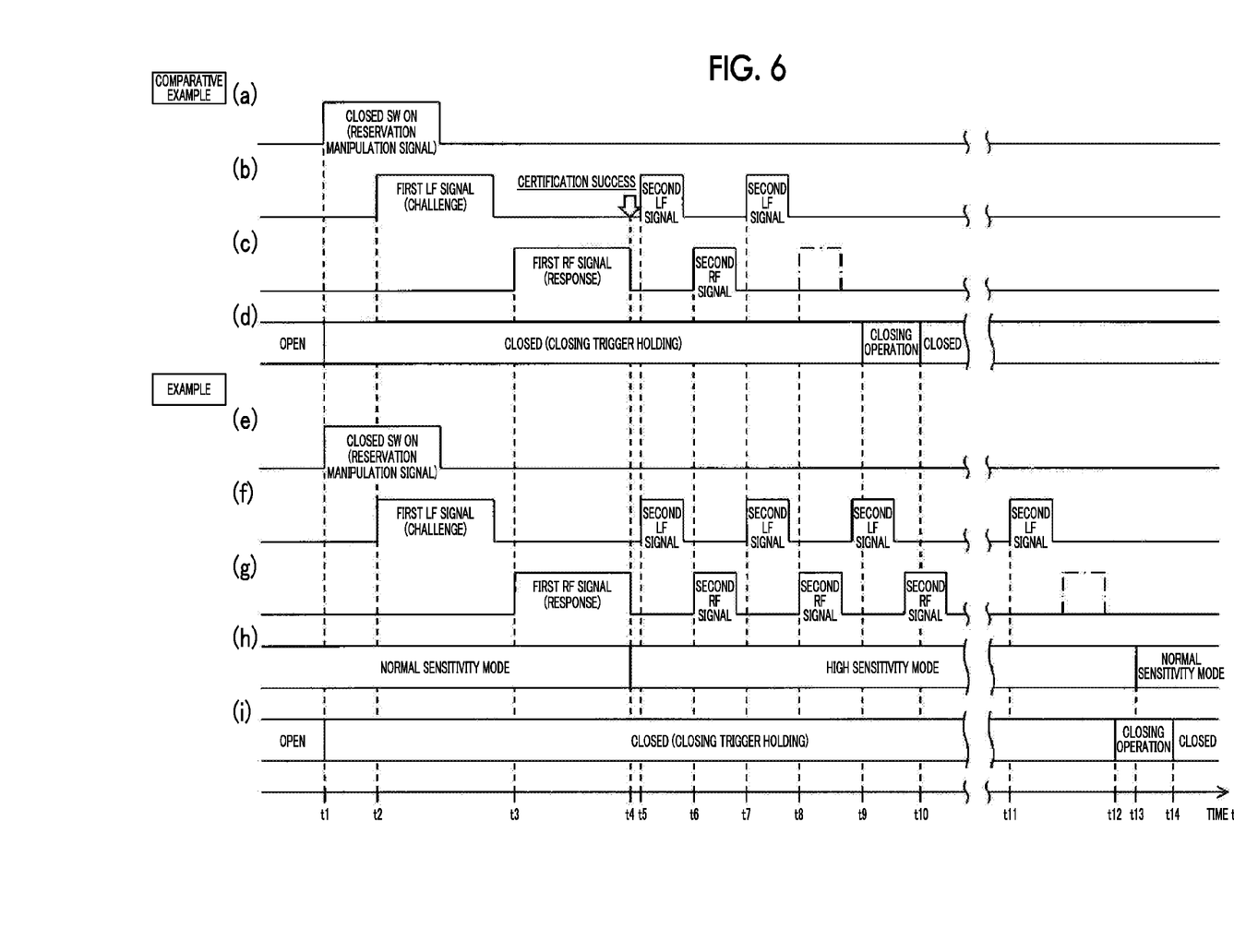
FIG. 6 is a timing chart illustrating an example of the operation of a smart key system related to a comparative example, and an example of the operation of the smart key system related to the present embodiment.

FIG. 6 is a timing chart illustrating an example of the operation of a smart key system related to a comparative example, and an example of the operation of the smart key system 1 related to the present embodiment. (a) to (d) of FIG. 6 are timing charts illustrating the operation of the smart key system related to the comparative example, and respectively illustrate a manipulation state of the PBD closed SW, a transmission state of the LF signal, a transmission state of the RF signal, and an operation state of the PBD. Additionally, (e) to (i) of FIG. 6 are timing charts illustrating the example of the operation of the smart key system 1 related to the present embodiment, and respectively illustrate a manipulation state of the PBD closed SW, a transmission state of the LF signal, a transmission state of the RF signal, a setting state of the reception sensitivity mode, and an operation state of the PBD. The smart key system related to the comparative example does not have the reception sensitivity control unit 5014, and is mainly different from the smart key system 1 related to the present embodiment in that the reception sensitivity of the receiving circuit 502 is always fixed to the "normal sensitivity mode" or its equivalent. Hereinafter, in the description related to the comparative example, the same constituent elements as those of the smart key system 1 related to the present embodiment will be designated by the same reference signs, and the description thereof will be performed.

In addition, in the smart key system related to the comparative example, the processing of Step S104 in the flowchart of FIG. 4 is omitted, and in the processing of Step S106, the reception sensitivity UP instruction is not included in the first LF signal. Additionally, in the smart key system related to the comparative example, the processing of Steps S208 and S218 in the flowchart of FIG. 5 is omitted. Additionally, in both of the examples of the comparative example and the present embodiment, it is premised that a user who possesses the portable device 3 is in a situation where the user is apart from the vehicle 2 at the same speed and in the same path.

First, the operation of the smart key system related to the comparative example will be described.

As illustrated in (a) of FIG. 6, ON-manipulation of the PBD closed SW installed in the vehicle 2 is performed by the user at a time t1.

Then, as illustrated in (b) of FIG. 6, the LF signal transmission processing unit 1111 of the vehicle-mounted device 10 transmits a first LF signal including the "challenge" and the "reception sensitivity UP instruction" at a time t2 (Steps S102 to S106).

Thereafter, as illustrated in (c) of FIG. 6, if the LF signal reception processing unit 5011 of the portable device 3 receives the first LF signal (Yes of Step S202), the RF signal transmission processing unit 5012 transmits the first RF signal including the "response" at a time t3 (Step S204).

Then, as illustrated in (b) of FIG. 6, if the RF signal reception processing unit 1112 of the vehicle-mounted device 10 receives the first RF signal (Yes of Step S110), at a time t4, the certification processing unit 1113 collates the "response" included in the first RF signal, and the decryption result of the "challenge" made by the certification processing unit 1113, and succeeds in certification of the portable device 3 (Yes of Step S114). Then, as illustrated in (b) of FIG. 6, the LF signal transmission processing unit 1111 of the vehicle-mounted device 10 transmits the second LF signal at a time t5 (Step S116).

Thereafter, as illustrated in (c) of FIG. 6, if the LF signal reception processing unit 5011 of the portable device 3 receives the second LF signal (Yes of Step S212), the RF signal transmission processing unit 5012 transmits the second RF signal at a time t6 (Step S214).

Thereafter, as illustrated in (b) of FIG. 6, if the RF signal reception processing unit 1112 of the vehicle-mounted device 10 receives the second RF signal (Yes of Step S120), the LF signal transmission processing unit 1111 transmits a secondary second LF signal at a time t7 (Step S116).

However, thereafter, the LF signal reception processing unit 5011 of the portable device 3 cannot receive the secondary second LF signal until time out (Yes of Step S216). This is because the user who possesses the portable device 3 is apart from the vehicle 2 (transmitting antenna 12) more than a position where the second LF signal is capable of being received in the "normal sensitivity mode" or its equivalent by the portable device 3. For that reason, as illustrated in (c) of FIG. 6, if the LF signal reception processing unit 5011 can receive the second LF signal, the second RF signal that should be transmitted at the time t8 is not transmitted (one-dot chain line in the drawing).

Thereafter, since the RF signal reception processing unit 1112 of the vehicle-mounted device 10 cannot receive the second RF signal until time out (Yes of Step S122), as illustrated in (d) of FIG. 6, the vehicle-mounted equipment control unit 1114 outputs the PBD closing request to the body ECU 20 at a time t9. This is because the vehicle-mounted device 10 can determine that the user who possesses the portable device 3 is apart from the vehicle 2 due to interruption of the second RF signal from the portable device 3. Accordingly, the closing of the PBD is started, and thereafter, the closing operation of the PBD is completed at a time t10.

However, in case of the comparative example, the reception sensitivity of the receiving circuit 502 is fixed to the "normal sensitivity mode" or its equivalent in the present embodiment, and if the battery lifespan of the portable device 3 is taken" into consideration, the reception sensitivity corresponding to the "normal sensitivity mode" can be set to be so high. For that reason, irrespective of the user is not apart from the vehicle 2, there is a possibility that the portable device 3 (LF signal reception processing unit 5011) may not be able to receive the first LF signal.

In contrast, the example of the operation of the smart key system 1 related to the present embodiment will be described.

In addition, since the operation of the vehicle-mounted device 10 and the portable device 3 illustrated (e) to (g) of FIG. 6 in the time t1 to the time t4 are the same as that of (a) to (c) of FIG. 6 related to the comparative example, the description thereof will be omitted, and the operation in the time t4 or its subsequent times will be made. Additionally, description will be performed on the premise that the ON-manipulation (refer to (e) of FIG. 6) of the PBD closed SW performed at the time t1 is manipulation of a target for the reception sensitivity UP.

As illustrated in (h) of FIG. 6, at the time t4, the reception sensitivity UP instruction is included in the first LF signal received from the LF signal reception processing unit 5011 (Yes of Step S206). Thus, the reception sensitivity control unit 5014 switches the reception sensitivity mode of the receiving circuit 502 from the "normal sensitivity mode" to the "high sensitivity mode" (Step S208).

Thereafter, as illustrated in (f) of FIG. 6, the LF signal transmission processing unit 1111 of the vehicle-mounted device 10 transmits the second LF signal at a time t5, similar to the case of the comparative example (Step S116).

Thereafter, as illustrated in (g) of FIG. 6, similar to the case of the comparative example, if the LF signal reception processing unit 5011 of the portable device 3 receives the second LF signal (Yes of Step S212), the RF signal transmission processing unit 5012 transmits the second RF signal at a time t6 (Step S214).

Thereafter, as illustrated in (f) of FIG. 6, similar to the case of the comparative example, if the RF signal reception processing unit 1112 of the vehicle-mounted device 10 receives the second RF signal (Yes of Step S120), the LF signal transmission processing unit 1111 transmits a secondary second LF signal at a time t7 (Step S116).

Thereafter, as illustrated in (g) of FIG. 6, unlike the case of the comparative example, if the LF signal reception processing unit 5011 of the portable device 3 receives the secondary second LF signal (Yes of Step S212), the RF signal transmission processing unit 5012 transmits a secondary second RF signal at a time t8 (Step S214). This is because the reception sensitivity mode of the receiving circuit 502 is changed to the "high sensitivity mode" and a communicable distance based on the second LF signal from the vehicle-mounted device 10 to the portable device 3 is extended. Thereafter, transmission and reception of the second LF signal and the second RF signal between the vehicle-mounted device 10 and the portable device 3 continue several times (Steps S116 to S122, Steps S210 to S216), and as illustrated in (f) of FIG. 6, at a time t11, the LF signal transmission processing unit 1111 of the vehicle-mounted device 10 transmits the second LF signal (Step S116).

However, thereafter, the LF signal reception processing unit 5011 of the portable device 3 cannot receive the second LF signal until time out (Yes of Step S216). This is because the user who possesses the portable device 3 is apart from the vehicle 2 (transmitting antenna 12) more than a position where the second LF signal is capable of being received in the "high sensitivity mode" by the portable device 3. For that reason, as illustrated in (g) of FIG. 6, if the LF signal reception processing unit 5011 can receive the second LF signal, the second RF signal that should be transmitted is not transmitted (one-dot chain line in the drawing).

Thereafter, since the RF signal reception processing unit 1112 of the vehicle-mounted device 10 cannot receive the second RF signal until time out (Yes of Step S122), as illustrated in (i) of FIG. 6, the vehicle-mounted equipment control unit 1114 outputs the PBD closing request to the body ECU 20 at a time t12. This is because the vehicle-mounted device 10 can determine that the user who possesses the portable device 3 is apart from the vehicle 2 due to interruption of the second RF signal from the portable device 3. Accordingly, the closing of the PBD is started, and thereafter, the closing operation of the PBD is completed at a time t14.

In the case of the present embodiment, since the reception sensitivity for receiving the second LF signal is made high (changed from the "normal sensitivity mode" to the "high sensitivity mode"), the portable device 3 can receive the second LF signal at a position sufficiently apart from the vehicle 2 compared to the case of the comparative example. Therefore, a situation can be prevented where the vehicle-mounted equipment 40, such as the PBD, can be prevented from operating at a position where the user is not sufficiently apart from the vehicle 2.

Additionally, since the LF signal reception processing unit 5011 of the portable device 3 cannot receive the second LF signal until time out (Yes of Step S216), at a time t13, the reception sensitivity control unit 5014 returns the reception sensitivity mode of the receiving circuit 502 from the "high sensitivity mode" to the "normal sensitivity mode" (Step S218). Accordingly, since the reception sensitivity mode of the receiving circuit 502 is returned to the "normal sensitivity mode" in a situation where it is not necessary to receive the second LF signal, the consumption current of the portable device 3 can be suppressed, and a decrease in the battery lifespan can be suppressed.

In this way, in the present embodiment, the LF signal transmission processing unit 1111 (the LF drive circuit 112 and the transmitting antenna 12) mounted on the vehicle 2 transmits the second LF signal (request signal) toward the outside of the vehicle compartment, the LF signal reception processing unit 5011 (the receiving antenna 60 and the receiving circuit 502) mounted on the portable device 3 receives the second LF signal from the outside, the RF signal transmission processing unit 5012 (the transmitting circuit 503 and the transmitting antenna 70) mounted on the portable device 3 transmits the second RF signal (response signal) to the vehicle 2, and the RF signal reception processing unit 1112 (tuner 13) mounted on the vehicle 2 receives the second RF signal from the outside of the vehicle compartment. Additionally, the vehicle-mounted equipment control unit 1114 mounted on the vehicle 2 causes the vehicle-mounted equipment 40 to perform the predetermined operation when the RF signal reception processing unit 1112 (tuner 13) mounted on the vehicle 2 has shifted from a state where the second RF signal is receivable from the portable device 3 to a state where the second RF signal is unreceivable in a case where the predetermined manipulation has been performed in the vehicle 2 (manipulating unit 30). Therefore, when it becomes impossible for the RF signal reception processing unit 1112 to receive the second RF signal (response signal) from the portable device 3, it can be determined that the user who possesses the portable device 3 has been apart from the vehicle 2. For that reason, the vehicle-mounted equipment 40 can be made to perform the predetermined operation on the basis of the predetermined manipulation in the vehicle 2, with an event that the user has been apart from the vehicle 2 as a trigger.

Also, the reception sensitivity control unit 5014 makes the reception sensitivity with which the LF signal reception processing unit 5011 (receiving circuit 502) receives the second LF signal (request signal) high until a predetermined timing in a case where the predetermined manipulation is performed in the vehicle 2. Therefore, when the predetermined manipulation is performed, it is possible to determine that the current stage is a stage before the vehicle-mounted equipment control unit 1114 makes the vehicle-mounted equipment 40 perform the predetermined operation. For that reason, by extending the communicable distance based on the second LF signal (request signal) from the vehicle 2 to the portable device 3 with an event that the predetermined manipulation has been performed as a trigger, it is confirmed that the user has been sufficiently apart from the vehicle, so that the vehicle-mounted equipment 40 can be made to perform the predetermined operation. That is, if necessary, the communicable distance when transmitting the second LF signal (request signal) from the vehicle 2 to the portable device 3 can be extended.

Additionally, in the present embodiment, the communicable distance based on the second LF signal (request signal) from the vehicle 2 to the portable device 3 is extended until the LF signal reception processing unit 5011 mounted on the portable device 3 shifts from a state where the second LF signal (request signal) is receivable to a state where the second LF signal is unreceivable (Yes of Step S216). Therefore, whether or not the RF signal reception processing unit 1112 can receive the second RF signal reliably in a state where the communicable distance is extended can be monitored until it becomes impossible for the LF signal reception processing unit 5011 to receive the second LF signal (request signal), that is, until it becomes impossible for the RF signal reception processing unit 1112 to receive the second RF signal (response signal). For that reason, it is reliably determined that the user has been sufficiently kept away, so that the vehicle-mounted equipment 40 can be operated.

In addition, the time required for the user to be sufficiently apart from the vehicle 2 may be set in advance, and the reception sensitivity mode may be returned to the normal sensitivity mode" after the time concerned has passed after the reception sensitivity mode is changed to the "high sensitivity mode".

Additionally, in the present embodiment, the vehicle-mounted equipment control unit 1114 closes the electric door in a case where the predetermined manipulation (for example, manipulation of the closed switch of the electric door) has been performed and in a case where the tuner 13 has shifted from the state where the second RF signal (response signal) is receivable to the state where the second RF signal is unreceivable. Additionally, the reception sensitivity control unit 5014 makes the reception sensitivity with which the receiving circuit 502 receives the second LF signal high until the predetermined timing in a case where the predetermined manipulation has been performed. Therefore, the electric door can be closed on the basis of the predetermined manipulation, with an event that the user has been apart from the vehicle 2 as a trigger. For that reason, it is confirmed that the user has been sufficiently apart from the vehicle 2, so that the electric door can be closed. For that reason, it is possible to avoid a situation where a discomfort is given to the user, for example, due to the electric door being closed at a timing with no intention of leaving the vehicle 2 (for example, a scene in which the user turns from the right of the vehicle 2 to the left thereof and performs unloading of goods) or the electric door beginning to move at a position where the user feels physiologically near.

Figure 5:
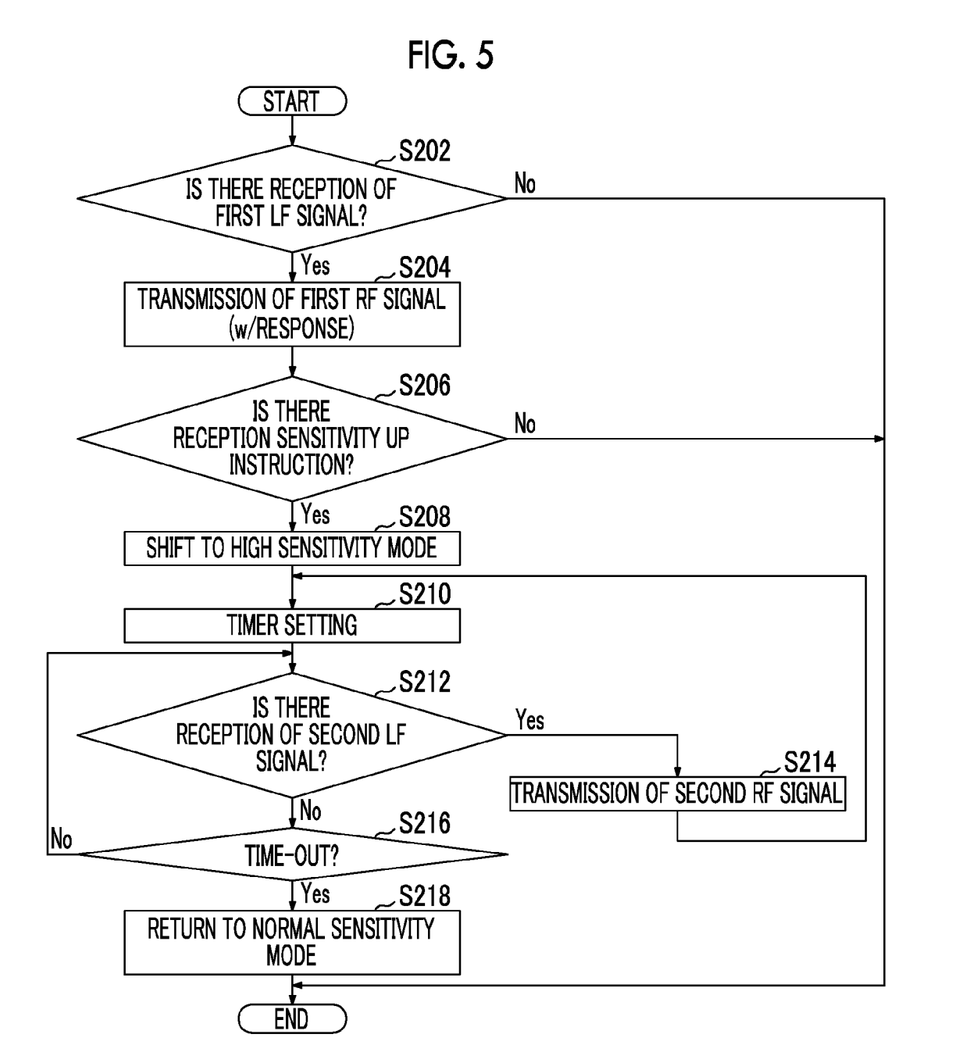
FIG. 5 is a flowchart schematically illustrating an example of processing in a portable device.

Although the electric door as the vehicle-mounted equipment 40 has been the PBD in the embodiment illustrated in the above-described FIGS. 4 to 6, the electric door may be the PSD.

Although the embodiments for carrying out disclosure have been described above in detail, the disclosure is not limited to the relevant specific embodiments, and various alterations and changes can be made within the scope of the disclosure described in the claims.

For example, in the above-described embodiment, the vehicle-mounted equipment 40 has been the electric door. The disclosure is not limited to this configuration. For example, the vehicle-mounted equipment 40 may be a locking device including an actuator, such as the door-lock motor of the door of the vehicle 2, and a lighting device (first lighting device) that is provided in the door handle or the like and lights one's feet when getting off the vehicle, and a lighting device (second lighting device) that performs production with radiation of light when a user is apart from the vehicle 2.

In a case where the vehicle-mounted equipment 40 is the locking device of the door, the vehicle-mounted equipment control unit 1114 makes the locking device lock the door in a case where the predetermined manipulation (for example, the manipulation of closing the door) has been performed and in a case where the RF signal reception processing unit 1112 has shifted from the state where the second RF signal (response signal) is receivable to the state where the second RF signal is unreceivable. Additionally, the reception sensitivity control unit 5014 makes the reception sensitivity with which the LF signal reception processing unit 5011 receives the second LF signal (request signal) high until the predetermined timing in a case where the predetermined manipulation has been performed. Therefore, the door can be locked on the basis of the predetermined manipulation, with an event that the user has been apart from the vehicle 2 as a trigger. Additionally, since it is possible to confirm that the user has been sufficiently apart from the vehicle and the door can be locked, it is possible to avoid a situation where a discomfort is given to the user, for example, due to the door being locked at a timing with no intention of leaving the vehicle.

Additionally, if the manipulation of closing the door is first performed in a case where the vehicle-mounted equipment 40 is the first lighting device, the first lighting device is turned on in order to light a user's feet. Then, the vehicle-mounted equipment control unit 1114 turns off the first lighting device in a case where the predetermined manipulation (for example, the manipulation of closing the door) has been performed and in a case where the RF signal reception processing unit 1112 has shifted from the state where the second RF signal (response signal) is receivable to the state where the second RF signal is unreceivable. Additionally, the reception sensitivity control unit 5014 makes the reception sensitivity with which the LF signal reception processing unit 5011 receives the second LF signal (request signal) high until the predetermined timing in a case where the predetermined manipulation has been performed. Therefore, the first lighting device can be turned off on the basis of the predetermined manipulation, with an event that the user has been apart from the vehicle 2 as a trigger. Additionally, since it is possible to confirm that the user has been sufficiently apart from the vehicle and the first lighting device can be turned off, it is possible to avoid a situation where a discomfort is given to the user, for example, due to the first lighting system being turned off at a timing with no intention of leaving the vehicle (for example, a scene in which the user turns from the right of the vehicle 2 to the left thereof and performs unloading of goods).

Additionally, in a case where the vehicle-mounted equipment 40 is the second lighting device including headlights having a drawing function, the vehicle-mounted equipment control unit 1114 operates the second lighting device in a predetermined irradiation pattern for production in a case where the predetermined manipulation (for example, the manipulation of closing the door) has been performed and in a case where the RF signal reception processing unit 1112 has shifted from the state where the second RF signal (response signal) is receivable to the state where the second RF signal is unreceivable. Additionally, the reception sensitivity control unit 5014 makes the reception sensitivity with which the LF signal reception processing unit 5011 receives the second LF signal (request signal) high until the predetermined timing in a case where the predetermined manipulation has been performed. Therefore, the second lighting device can be operated in the predetermined irradiation pattern on the basis of the predetermined manipulation, with an event that the user has been apart from the vehicle 2 as a trigger. Additionally, since it is possible to confirm that the user has been sufficiently apart from the vehicle and the second lighting device can be operated, it is possible to avoid a situation where a discomfort is given to the user, for example, due to the second lighting device being operated in the predetermined irradiation pattern at a timing with no intention of leaving the vehicle.

Additionally, in the above-described embodiment, the predetermined manipulation for making the vehicle-mounted equipment 40 perform the predetermined operation (for example, the manipulation of the effect that the PBD is closed) is performed in the vehicle 2. However, an aspect in which the predetermined manipulation is performed in the portable device 3 may be adopted. In this case, the portable device 3 (specifically, the RF signal transmission processing unit 5012) transmits a signal of the effect that the predetermined manipulation has been performed in the portable device 3 to the vehicle-mounted device 10, and the RF signal reception processing unit 1112 of the vehicle-mounted device 10 notifies the vehicle-mounted equipment control unit 1114 of that effect if the signal is received. Accordingly, the same effects as the above-described embodiment can be obtained.

Additionally, in the above-described embodiment, the LF signal reception processing unit 5011 of the portable device 3 makes the reception sensitivity with which the second LF signal is received higher than the normal sensitivity (normal value). However, an aspect may be adopted in which the LF signal transmission processing unit 1111 of the vehicle-mounted device 10 makes transmission intensity with which the second LF signal is transmitted higher than normal intensity (normal value). Since the communicable distance based on the second LF signal from the vehicle 2 to the portable device 3 can be extended, the same effects as the above-described embodiment can be obtained. Additionally, as another aspect, an aspect may be adopted in which the LF signal reception processing unit 5011 of the portable device 3 makes the reception sensitivity with which the second LF signal is received higher than the normal sensitivity (normal value) and the LF signal transmission processing unit 1111 of the vehicle-mounted device 10 makes transmission intensity with which the second LF signal is transmitted higher than normal intensity (normal value).

What is claimed is:

1. A smart key system that causes vehicle-mounted equipment to perform a predetermined operation based on two-way communication between a vehicle and a portable device, the smart key system comprising:
- a first transmitting unit mounted on the vehicle and configured to transmit a request signal toward an outside of a vehicle compartment of the vehicle;
- a first receiving unit mounted on the vehicle and configured to receive an electric wave from an outside of the vehicle compartment of the vehicle;
- a second receiving unit mounted on the portable device and configured to receive an electric wave from an outside of the portable device;
- a second transmitting unit mounted on the portable device and configured to transmit an electric wave to the outside of the portable device, the second transmitting unit being configured to transmit a response signal to the vehicle when the second receiving unit has received the request signal;
- a control unit mounted on the vehicle and configured to cause the vehicle-mounted equipment to perform the predetermined operation when the first receiving unit has shifted from a state where the response signal is receivable to a state where the response signal is unreceivable in a case where a predetermined manipulation has been performed in the vehicle or the portable device; and
- a communicable distance extending unit configured such that at least one of a transmission intensity with which the first transmitting unit transmits the request signal and a reception sensitivity with which the second receiving unit receives the request signal is made higher than a predetermined normal value until a predetermined timing when the predetermined manipulation has been performed in the vehicle or the portable device.

2. The smart key system according to claim 1, wherein the predetermined timing is specified as after the second receiving unit has shifted from the state where the request signal is receivable to the state where the request signal is unreceivable.

3. The smart key system according to claim 1, wherein the vehicle-mounted equipment is an electric door, and the predetermined operation is closing of the electric door.

4. The smart key system according to claim 1, wherein the vehicle-mounted equipment is a locking device of a door, and the predetermined operation is locking.

5. The smart key system according to claim 1, wherein the communicable distance extending unit is configured until the predetermined timing such that the reception sensitivity with which the second receiving unit receives the request signal is made higher than the predetermined normal value, when the predetermined manipulation has been performed in the vehicle or the portable device.

6. The smart key system according to claim 5, wherein the communicable distance extending unit sets a timer when the reception sensitivity of the second receiving unit is set to be higher than the predetermined normal value, and is configured such that the reception sensitivity is returned to the predetermined normal value when the second receiving unit does not receive the request signal until time out of the timer.

7. The smart key system according to claim 5, wherein the first transmitting unit is configured to be capable of transmitting the request signal including an instruction for making the reception sensitivity of the second receiving unit high.

8. A smart key system comprising:
- a vehicle-mounted device that is mounted on a vehicle and causes vehicle-mounted equipment to perform a predetermined operation, the vehicle-mounted device including a smart electronic control unit, and the smart electronic control unit being configured to transmit a request signal toward an outside of a vehicle compartment of the vehicle and receive an electric wave from the outside of the vehicle compartment of the vehicle; and
- a portable device that causes the vehicle-mounted equipment to perform the predetermined operation using the vehicle-mounted device based on two-way communication between the vehicle and the portable device, the portable device including a portable device electronic control unit, and the portable device electronic control unit being configured to receive an electric wave from an outside of the portable device and transmit an electric wave to the outside of the portable device and being configured to transmit a response signal to the vehicle when the request signal has been received,
- wherein the smart electronic control unit is configured to cause the vehicle-mounted equipment to perform the predetermined operation when a shift from a state where the response signal is receivable to a state where the response signal is unreceivable has been made in a case where a predetermined manipulation has been performed in the vehicle or the portable device, and
- wherein the smart electronic control unit and the portable device electronic control unit are configured to extend a communicable distance between the vehicle-mounted device and the portable device such that at least one of a transmission intensity with which the smart electronic control unit transmits the request signal and a reception sensitivity with which the portable device electronic control unit receives the request signal is made higher than a predetermined normal value until a predetermined timing when the predetermined manipulation has been performed in the vehicle or the portable device.

* * * * *